Jan. 14, 1964
A. G. NERHEIM
3,117,439
GAS DENSITY BALANCE
Filed Sept. 28, 1959
2 Sheets-Sheet 1
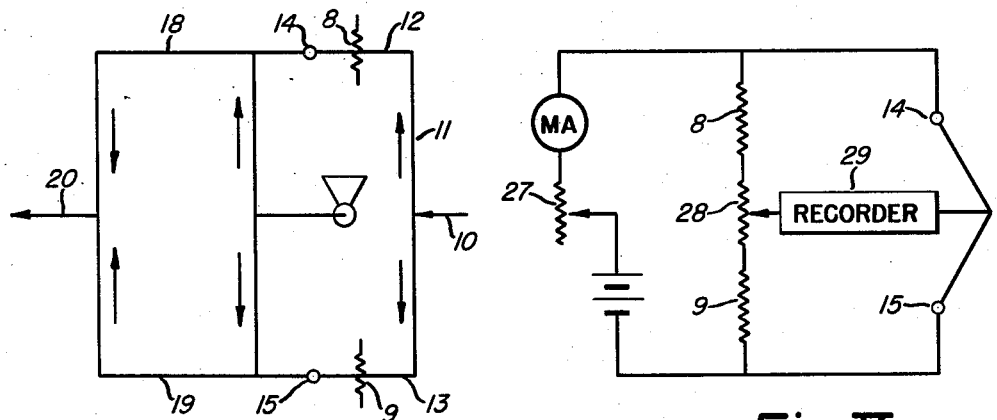
Fig. I
Fig. V
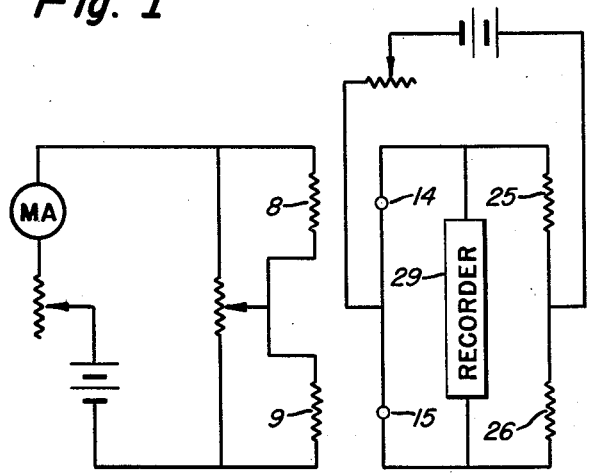
Fig. IV
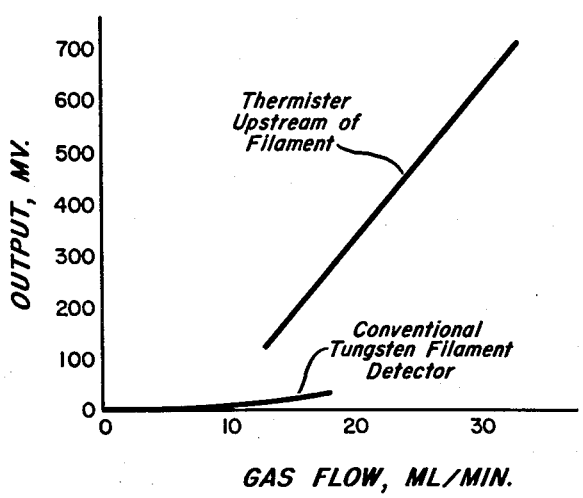
Fig. VI
INVENTOR.
Arvie Glenn Nerheim
BY
ATTORNEY

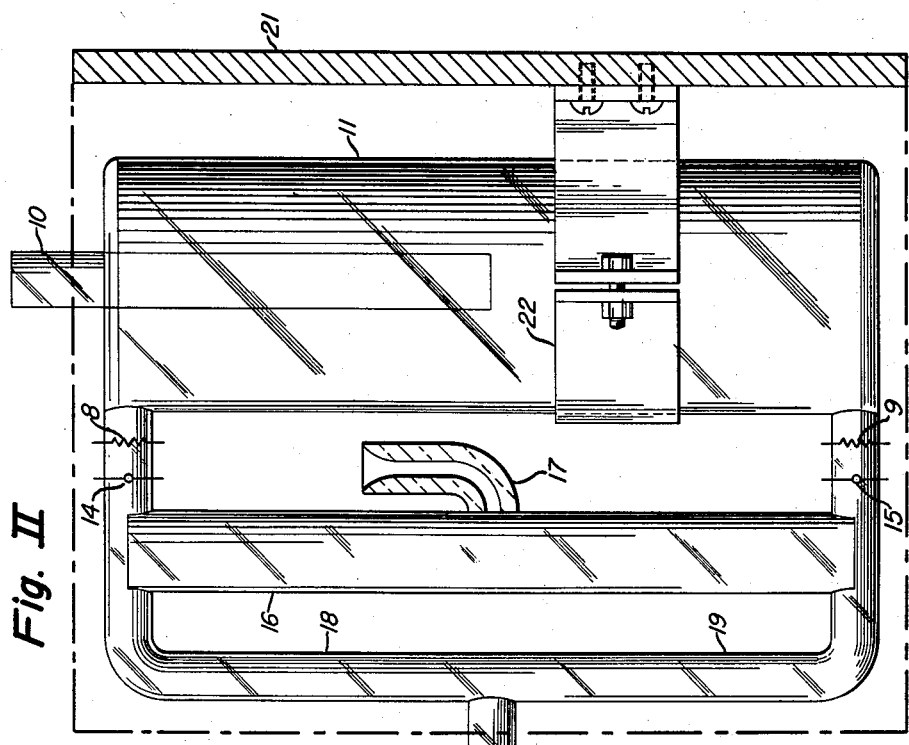
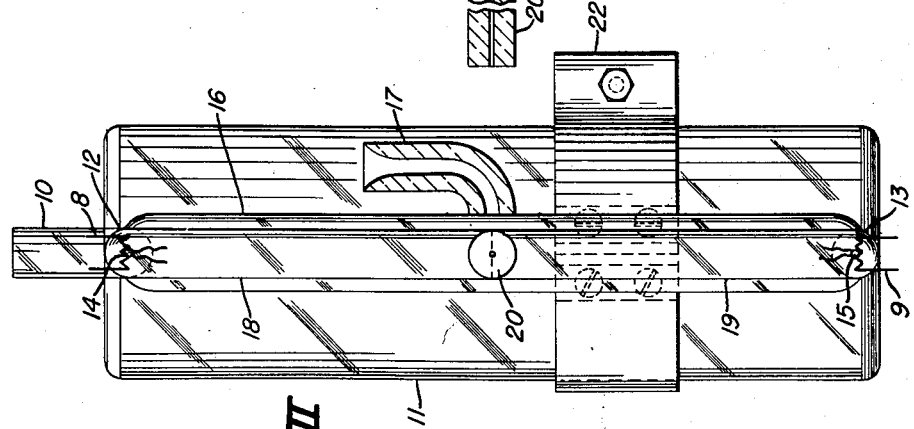

United States Patent Office 3,117,439
Patented Jan. 14, 1964

3,117,439
GAS DENSITY BALANCE
Arvie Glenn Nerheim, Crown Point, Ind., assignor to Standard Oil Company, Chicago, Ill., a corporation of Indiana
Filed Sept. 28, 1959, Ser. No. 842,874
4 Claims. (Cl. 73—30)

This invention relates to the analyses of fluids by means of measuring the density thereof. More particularly, the invention relates to an improved detector for measuring gas and vapor densities as an adjunct to gas chromatography.

Gas chromatography, a new and useful technique for separation and analysis of complex mixtures of volatile materials, is a system wherein components of such mixtures are separated in simple and inexpensive equipment by partition between a stationary phase and a moving gas phase. A few microliters of sample can be analyzed in a relatively short time and the technique is applicable to samples ranging from fixed gases to those that must be distilled at low pressure.

The separations take place in small columns packed with a specific type of solid packing which supports the stationary liquid phase. The liquid, usually amounting to about 40 weight percent of the packing, is distributed as a thin film that provides a large surface for the gas to contact. Components of a sample are separated as they are carried through the column by a moving carrier gas phase, called the eluting gas, and the eluted components are detected as they pass from the column. Nitrogen, helium, hydrogen and carbon dioxide are common eluting gases.

Typically one component of a binary mixture is less soluble in the stationary phase than the other and the less soluble component will remain in the gas phase and be swept through the column at nearly the velocity of the eluting gas. The second component, however, will pass through the column at a lower rate because the process of dissolving in and expelling from the stationary liquid phase takes additional time. Because of differences in partition, the first and second components emerge from the column in the eluting gas at different times and thus are separated.

Several types of detectors have heretofore been proposed and tried for sensing the presence of the component in the eluting gas and it is with respect to such detectors that this invention is directed.

Recently, component detectors have been devised which are sensitive to changes in density of the eluted gas caused by the presence of a component of the sample. These so-called gas density balances respond to density changes in a manner which is fast, accurate, and insensitive to flow-rate. Certain of the balances produce an electrical output which is linear with variations in density.

A recently developed gas density balance of this type embodies twin electrically-heated detectors made of a material having a substantial temperature coefficient of resistance, which are disposed in a flowing reference gas stream, the reference stream being split into two streams, each of which passes over one of the twin detectors. The sample stream is introduced into the apparatus downstream of the twin detectors, and when such sample stream contains a component having a density greater than that of the reference gas, flow tends downward with the result that the reference gas is diverted and the flow over one detector is reduced while the flow over the other is increased. This cools (or, in certain embodiments, heats) the latter detector at a greater rate and permits the other detector to increase in temperature (because of slower dissipation of heat therefrom), causing an imbalance in the electrical bridge circuit including the twin detectors. The resulting net change in the electrical resistances of the detectors is then measured as an indication of the density of the gas sample.

A primary object of the present invention is to improve the sensitivity and the signal-to-noise ratio of gas density balances by providing an improved flow detector system for such balances. Other and more particular objects will be apparent as the description of the invention proceeds.

Briefly, in accordance with the invention, I employ reference gas flow detectors comprising an electrically-heated wire filament and a separate temperature-sensitive electrical resistance element heated by exposure to the filament. These resistance elements may for example be platinum or tungsten wire filaments or may, in the preferred embodiment, be thermistors. In balances having twin detectors, I use two sets of filaments and resistance elements, one set in each reference gas flow tube.

The electrically heated filaments may be located either upstream or downstream of the temperature-sensitive resistance element. If located upstream, the temperature of the resistance element is increased by increasing gas flow since more heat is conducted from the filament to the element. On the other hand, if the electrically heated filament is located downstream of the resistance element, the latter receives heat only by radiation and diffusion of hot molecules, and since it is cooled both by increasing the flow of cool gas and by a reduction in the temperature of the heated filament, an increasing reference gas flow decreases its temperature. In the preferred embodiment, the heated filament is located upstream of the resistance element, as this increases signal to noise ratio somewhat and permits a lower filament temperature to reduce the possibility of burning out the resistance elements.

Further details and advantages of the described system will be discussed by reference to the accompanying drawings wherein:

FIGURE I is a schematic view of a gas density balance flow detector in accordance with the invention;

FIGURE II is an elevation of a preferred embodiment of the apparatus embodying the principles of FIGURE I;

FIGURE III is a side view of the apparatus in FIGURE II;

FIGURE IV is an electrical bridge circuit for the inventive flow detectors wherein the heated filaments and resistance elements are each in independent circuits;

FIGURE V is an electrical bridge circuit including all of the filaments and resistance elements in one bridge; and FIGURE VI shows the sensitivity of the inventive system as compared with a conventional tungsten filament detector.

Referring to FIGURE I, the reference gas in introduced by reference gas inlet tube 10 into the mid-point of reference gas chamber 11. The flow of reference gas from the reference gas chamber 11 is divided between top detector tube 12 and bottom detector tube 13. Heated filaments 8 and 9, and resistance elements 14 and 15 are each disposed in detector tubes 12 and 13. According to the preferred embodiment, heated filaments 8 and 9 are located upstream of resistance elements 14 and 15. The sample tube 16 extends between the top detector tube 12 and the bottom detector tube 13 and is provided with sample inlet 17.

When a gas sample entering sample tube 16 contains a sample component having a density greater than that of the reference gas flowing through the balance, the flow in sample tube 16 tends downward. This decreases flow across the bottom detector tube 13 and increases flow across the top detector tube 12. This results in a net change in the resistances of the resistance elements 14 and 15 which change is measured as an indication of the density of the gas sample introduced into the balance.

The reference gas of now adjusted composition and differing flow rate passes from top detector tube 12 into top outlet tube 18 and from bottom detector tube 13 into bottom outlet tube 19. The combined flow from outlet tubes 18 and 19 emerges from the balance by way of outlet tube 20 which is flow-restrictive.

Referring to FIGURES II and III, the dimensions of the apparatus schematically shown in FIGURE I have been chosen to make the most effective use of any change in density to vary the filament resistances. In FIGURES II, III and IV, the reference gas inlet tube 10 has an inner diameter of 4 mm., the reference gas chamber 11 is about 100 mm. high with a diameter of about 30 mm. The reference gas inlet tube 10 is shown as extending through the top wall of the reference gas chamber 11 and it is contemplated that such inlet tube 10 may alternatively enter the chamber 11 through the bottom end wall or a side wall. In any event, it is desired to provide for the discharge of the reference gas from the inlet tube 10 at about the geometric center of the chamber 11.

The top and bottom detector tubes 12 and 13 have an I.D. of about 4 mm. The sample tube 16 has an I.D. of about 8 mm., and the sample inlet 17 comprises an elbow having an I.D. of about 2 mm. The outlet capillary tube 20, receiving flow from the top and bottom outlet tubes 18 and 19, has an I.D. of about 0.7 mm. and a length of 40 mm.

One objective in selecting these dimensions is to maximize the effect of change in density caused by the sample and to minimize the pressure drop caused by friction of gas flow, so as to obtain high sensitivity to changes in density constant with linearity and speed of response.

The sample tube 16 is kept to a small volume to give a fast response. Increasing the height of the sample tube 16 increases the driving force of the differences in density but it also increases friction and volume; increasing the diameter of the sample tube 16 also increases volume but it has the beneficial effect of decreasing friction. It tends to compensate for viscosity whereas the effects of viscosity may otherwise be such as to cause non-linear response.

As the driving force is expanded in the top and bottom detector tubes 12 and 13, the resistances of the elements 14 and 15 change with change in temperature which, in turn, reflects the changes in rates of flow over the filaments. Minimizing friction in the balance can be expected to give the largest change in velocity and hence largest electrical resistance change in the filaments. On the other hand, friction insures linear response at low flow rates. It is contemplated that balances of either characteristics may be devised in view of the description herein given. For example, an even faster detector may be designed by reducing the height of the sample tube 16 by 50 percent or more. If more sensitivity is needed, the height and diameter of the sample tube 16 can be increased and the length of the detector tubes 12 and 13 may be shortened.

The complete unit is housed within a temperature-controlled cabinet 21 and supported within the cabinet 21 by any suitable means, such as a bracket 22 clamped to the reference gas chamber 11, for example. It will be apparent that the reference gas inlet tube 10 extends through a top wall of the cabinet 21 and that the outlet capillary tube 20 projects through an end wall thereof. Suitable temperature control means including heaters, thermostats, and the like can be provided for controlling the temperature of the cabinet 21. However, since such temperature control systems are well known in the art, details are not given here.

Referring to FIGURE IV, an electrical circuit is shown wherein resistance elements 14 and 15 are in a Wheatstone bridge circuit with reference resistors 25 and 26. Heated filaments 8 and 9 are in a second, independent, circuit whereby each filament may be individually heat controlled in order to zero the bridge. Thus recorder 29 is zeroed by manually adjusting the current through each of filaments 8 and 9 to equalize the resistance in the thermistors 14 and 15. This technique and circuit have the unique feature of making the Wheatstone bridge perfectly symmetrical, that is, I, E, and R are equal in each leg of the bridge. Consequently, the effects of variations in ambient temperature and bridge current are cancelled out so as to provide exceptional baseline stability.

Referring to FIGURE V, there is shown a Wheatstone bridge circuit including all of the heated filaments 8 and 9 and the temperature-sensitive detector elements 14 and 15 comprising thermistors. This unified type of bridge circuit is best employed when the heated filaments are upstream of the resistance elements and when the latter are thermistors, since the change in resistance of all components is made additive. A voltage supply 27, a zero adjusting means 28, and an output voltage-responsive means such as recorder 29, complete a typical bridge circuit. This general type of bridge circuit and its operation are well known and will not be described in further detail.

The top and bottom detector tubes 12 and 13 contain the temperature-sensitive elements 14 and 15, respectively, which may be precise lengths of tungsten or platinum wire, but it is preferred that they be thermistors, i.e. oxide or sulfide type semiconductors having negative resistance characteristics in which an increase in temperature of the resistance element decreases resistance. Such a detector element also increases sensitivity of the balance. A symmetrical configuration, with each filament located the same distance from its associated element, is preferred.

FIGURE VI compares the sensitivity of a flow detector consisting of a tungsten filament with that of a detector according to the invention, having a thermistor upstream of a heated filament. The sensitivity of the latter detector is almost two orders of magnitude higher than that of the former. Furthermore, the signal-to-noise ratio is also much improved.

The gas density balance may be made of any inert fluid-impervious material such as glass, brass, or stainless steel.

Although the invention has been described with reference to a preferred embodiment thereof and as applied to a particular type of gas density balance, it is to be understood that these are by way of illustration only. Accordingly, it is contemplated that modifications and variations can be made in the apparatus by those skilled in the art in light of the preceding description without departing from the spirit and broad scope of the invention.

I claim:

1. In a gas density balance apparatus having a pair of vertically displaced reference gas flow conduits, a sample introduction conduit disposed between said flow conduits and in communication with each, and means for determining differentials in rates of flow of reference gas through said flow conduits caused by the introduction of a sample into the sample introduction conduit, which sample has a density different from that of the reference gas, the improvement wherein said means for determining differentials in rates of flow of reference gas comprises:
an electrically heated filament and a temperature-sensitive electrical resistance element heated by said filament disposed in each of said reference gas flow conduits;
and an electrical bridge circuit including both of said filaments and both of said resistance elements therein, whereby the changes of resistance of all said filaments and elements are made additive, said bridge circuit providing means for measuring said changes in resistance as an indication of differentials in said rates of flow of reference gas.

2. Apparatus of claim 1 wherein said electrically-heated filament is located upstream of said temperature-sensitive electrical resistance element.

3. Apparatus of claim 1 wherein said electrically-heated filament is located downstream of said temperature-sensitive electrical resistance element.

4. Apparatus of claim 1 wherein said temperature-sensitive electrical resistance elements are thermistors.

References Cited in the file of this patent

UNITED STATES PATENTS

| | | |
|---|---|---|
| 2,633,737 | Richardson | Apr. 7, 1953 |
| 2,639,610 | Anderson | May 26, 1953 |
| 2,728,219 | Martin | Dec. 27, 1955 |
| 2,729,976 | Laub | Jan. 10, 1956 |
| 2,734,381 | Jacobson | Feb. 14, 1956 |
| 2,916,914 | Graves et al. | Dec. 15, 1959 |